US007872633B2

(12) United States Patent
Zhou et al.

(10) Patent No.: US 7,872,633 B2
(45) Date of Patent: Jan. 18, 2011

(54) ELECTROPHORETIC DISPLAY AND A METHOD OF SHAKING AN ELECTROPHORETIC DISPLAY FROM AN EXTREME POSITION

(75) Inventors: Guofu Zhou, Eindhoven (NL); Mark Thomas Johnson, Eindhoven (NL)

(73) Assignee: Adrea, LLC, Sunnyvale, CA (US)

( * ) Notice: Subject to any disclaimer, the term of this patent is extended or adjusted under 35 U.S.C. 154(b) by 561 days.

(21) Appl. No.: 10/515,686

(22) PCT Filed: May 12, 2003

(86) PCT No.: PCT/IB03/01983

§ 371 (c)(1),
(2), (4) Date: Nov. 24, 2004

(87) PCT Pub. No.: WO03/100757

PCT Pub. Date: Dec. 4, 2003

(65) Prior Publication Data
US 2005/0179641 A1    Aug. 18, 2005

(30) Foreign Application Priority Data

May 24, 2002    (EP) .................................. 02077017
Jan. 23, 2003    (EP) .................................. 03100133

(51) Int. Cl.
*G09G 3/34*    (2006.01)
(52) U.S. Cl. ..................................................... 345/107

(58) Field of Classification Search ................. 345/107, 345/204, 208; 349/86, 87; 359/256
See application file for complete search history.

(56) References Cited

U.S. PATENT DOCUMENTS

| 4,041,481 | A | * | 8/1977 | Sato ........................... 345/107 |
| 4,104,520 | A | * | 8/1978 | Lewis et al. .................... 378/29 |
| 4,137,524 | A | * | 1/1979 | Chen et al. ..................... 345/50 |
| 4,187,160 | A | * | 2/1980 | Zimmermann ............... 359/296 |
| 4,947,157 | A | * | 8/1990 | Di Santo et al. ............. 345/107 |

(Continued)

FOREIGN PATENT DOCUMENTS

JP    51-41993    4/1976

(Continued)

*Primary Examiner*—Sumati Lefkowitz
*Assistant Examiner*—Robert E Carter, III
(74) *Attorney, Agent, or Firm*—Finnegan, Henderson, Farabow, Garrett & Dunner, LLP

(57) ABSTRACT

An electrophoretic display having charged particles that are able to occupy, between a first and second electrode, two limit positions and intermediate positions between the two limit positions which are defined by a drive voltage. An addressing circuit generates the drive voltage waveform by successively applying between the first electrode and the second electrode, during an image update period, a reset pulse enabling particles of the display to substantially occupy one of the limit positions, and a drive pulse having a level in accordance with an optical state to be reached by one of the pixels. The addressing circuit generates a first shaking pulse having at least one preset pulse having energy sufficient to release particles present in one of the limit positions, but insufficient to enable the particles to reach the other one of the extreme limit positions.

13 Claims, 6 Drawing Sheets

U.S. PATENT DOCUMENTS

Figure 1:
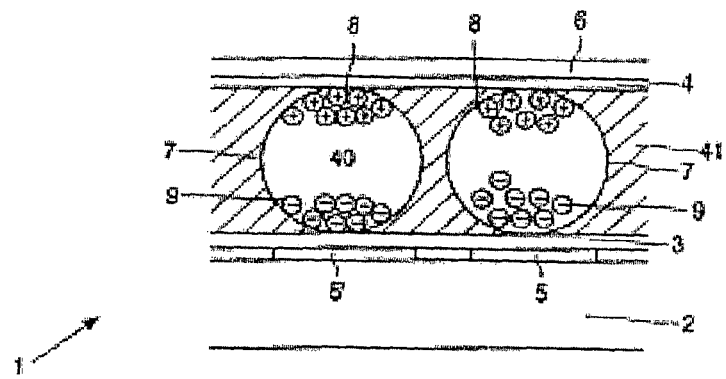

| | | | |
|---|---|---|---|
| 5,066,946 A * | 11/1991 | Disanto et al. | 345/107 |
| 5,095,377 A | 3/1992 | Kobayashi et al. | |
| 5,353,138 A * | 10/1994 | Van Winsum | 349/41 |
| 5,648,793 A * | 7/1997 | Chen | 345/96 |
| 5,835,075 A | 11/1998 | Nomura et al. | |
| 5,961,804 A | 10/1999 | Jacobson et al. | |
| 6,120,839 A | 9/2000 | Comiskey et al. | |
| 6,130,774 A | 10/2000 | Albert et al. | |
| 6,236,385 B1 * | 5/2001 | Nomura et al. | 345/95 |
| 6,504,524 B1 | 1/2003 | Gates et al. | |
| 6,531,997 B1 * | 3/2003 | Gates et al. | 345/107 |
| 6,753,844 B2 * | 6/2004 | Machida et al. | 345/107 |
| 6,762,744 B2 * | 7/2004 | Katase | 345/107 |
| 7,012,600 B2 * | 3/2006 | Zehner et al. | 345/214 |
| 2003/0128179 A1 * | 7/2003 | Credelle | 345/88 |

FOREIGN PATENT DOCUMENTS

| | | |
|---|---|---|
| JP | 05095377 A | 4/1993 |
| JP | 0717504 A | 7/1995 |
| JP | 2002116734 A | 4/2002 |
| WO | 9953373 A1 | 10/1999 |
| WO | 03079323 A1 | 9/2003 |
| WO | 2004066252 A1 | 8/2004 |

* cited by examiner

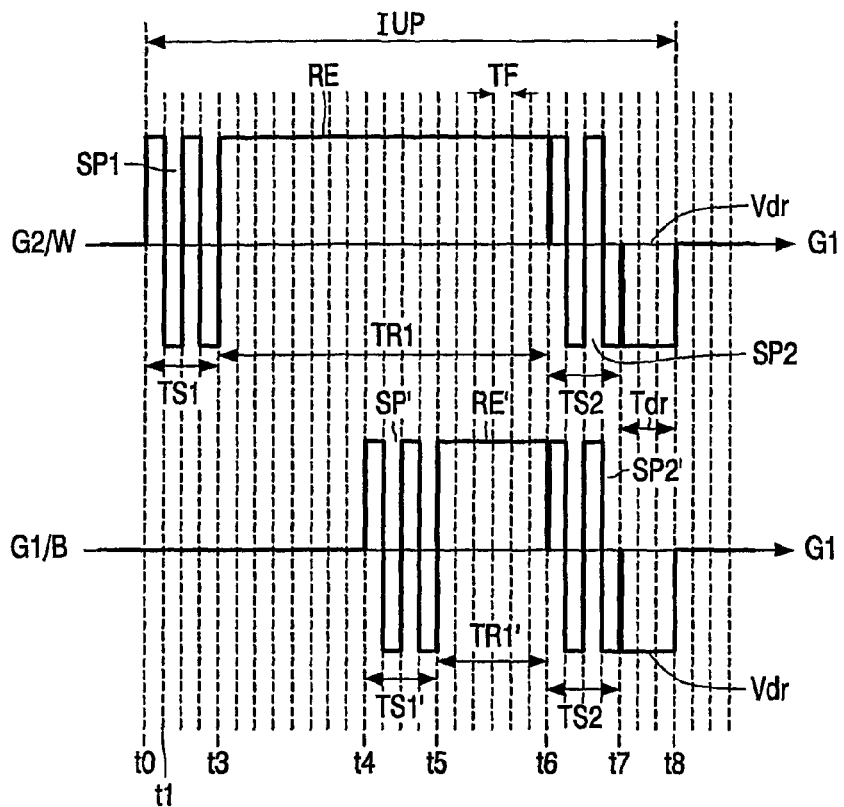
FIG. 3A
FIG. 3B
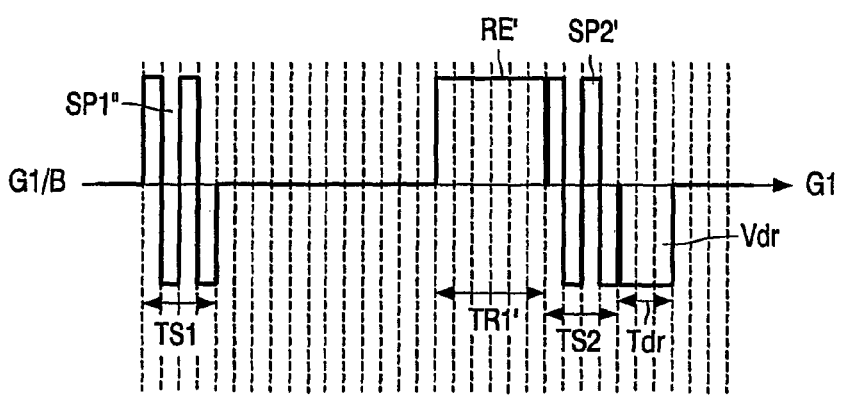
FIG. 3C
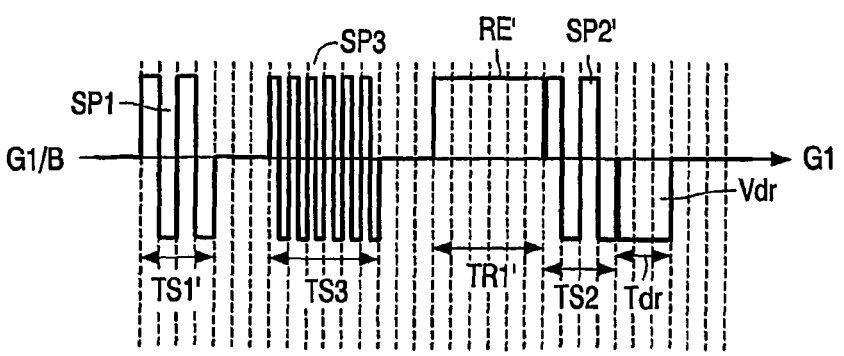
FIG. 3D

ELECTROPHORETIC DISPLAY AND A METHOD OF SHAKING AN ELECTROPHORETIC DISPLAY FROM AN EXTREME POSITION The invention relates to an electrophoretic display, a display apparatus comprising such an electrophoretic display, and a method of driving an electrophoretic display.

A display device of the type mentioned in the opening paragraph is known from international patent application WO 99/53373. This patent application discloses an electronic ink display which comprises two substrates, one of which is transparent, the other substrate is provided with electrodes arranged in rows and columns. Display elements or pixels are associated with intersections of the row and column electrodes. Each display element is coupled to the column electrode via a main electrode of a thin-film transistor (further referred to as TFT). A gate of the TFT is coupled to the row electrode. This arrangement of display elements, TFT's and row and column electrodes jointly forms an active matrix display device.

Each pixel comprises a pixel electrode which is the electrode of the pixel which is connected via the TFT to the column electrodes. During an image update period or image refresh period, a row driver is controlled to select all the rows of display elements one by one, and the column driver is controlled to supply data signals in parallel to the selected row of display elements via the column electrodes and the TFT's. The data signals correspond to image data to be displayed.

Furthermore, an electronic ink is provided between the pixel electrode and a common electrode provided on the transparent substrate. The electronic ink is thus sandwiched between the common electrode and the pixel electrodes. The electronic ink comprises multiple microcapsules of about 10 to 50 microns. Each microcapsule comprises positively charged white particles and negatively charged black particles suspended in a fluid. When a positive voltage is applied to the pixel electrode with respect to the common electrode, the white particles move to the side of the microcapsule directed to the transparent substrate, and the display element appears white to a viewer. Simultaneously, the black particles move to the pixel electrode at the opposite side of the microcapsule where they are hidden from the viewer. By applying a negative voltage to the pixel electrode with respect to the common electrode, the black particles move to the common electrode at the side of the microcapsule directed to the transparent substrate, and the display element appears dark to a viewer. When the electric field is removed, the display device remains in the acquired state and exhibits a bi-stable character. This electronic ink display with its black and white particles is particularly useful as an electronic book.

Grey scales can be created in the display device by controlling the amount of particles that move to the common electrode at the top of the microcapsules. For example, the energy of the positive or negative electric field, defined as the product of field strength and time of application, controls the amount of particles which move to the top of the microcapsules.

The known display device has the drawback that the appearance of a pixel depends on the history of the voltages supplied across the pixel.

From the non-pre-published patent applications in accordance to applicants docket referred to as PHNL020441 and PHNL030091 which have been filed as European patent applications 02077017.8 and 03100133.2 it is known to minimize the image retention by using pre-pulses also referred to as shaking pulse. Preferably, the shaking pulse comprise a series of AC-pulses, however, the shaking pulse may comprise a single pulse only. The pre-published patent applications are directed to the use of shaking pulses, either directly before the drive pulses, or directly before the reset pulse. PHNL030091 further discloses that the picture quality can be improved by extending the duration of the reset pulse which is applied before the drive pulse. The reset pulse has an energy sufficient to bring the pixel into one of two limit optical states. The duration of the reset pulse may depend on the required transition of the optical state.

For example, if black and white particles are used, the two limit optical states are black and white. In the limit state black, the black particles are at a position near to the transparent substrate, in the limit state white, the white particles are at a position near to the transparent substrate.

The drive pulse has an energy to change the optical state of the pixel to a desired level in-between the two limit optical states. Also the duration of the drive pulse may depend on the required transition of the optical state.

The non-prepublished patent application PHNL030091 discloses in an embodiment that the shaking pulse precedes the reset pulse. The each level of the shaking pulse has a duration sufficient to release particles present in one of the extreme positions, but insufficient to enable said particles to reach the other one of the extreme positions. The shaking pulse increases the mobility of the particles such that the reset pulse has an immediate effect. If the shaking pulse comprises more than one preset pulse, each preset pulse has the duration of a level of the shaking pulse. For example, if the shaking pulse has successively a high level, a low level and a high level, this shaking pulse comprises three preset pulses. If the shaking pulse has a single level, only one preset pulse is present.

The complete voltage waveform which has to be presented to a pixel during an image update period is referred to as the drive voltage waveform. The drive voltage waveform usually differs for different optical transitions of the pixels.

The driving of the electrophoretic display in accordance with the present invention differs from the driving disclosed in the non-prepublished patent application in that, in each drive voltage waveform, the shaking pulse occurs during a same shaking period for all pixels. This is realized even although the reset pulse and/or the drive pulse may have a duration which depends (for example, linearly) on a difference between optical states of the pixel before and after an image update period. As discussed earlier, the shaking pulse may comprise a single preset pulse or a series of preset pulses.

A first aspect of the invention provides an electrophoretic display as claimed in claim 1. A second aspect of the invention provides a display apparatus as claimed in claim 11. A third aspect of the invention provides a method of driving an electrophoretic display as claimed in claim 12. Advantageous embodiments of the invention are defined in the dependent claims.

In accordance with the first aspect of the invention, the shaking pulse which precedes the reset pulse or which occurs in-between the reset pulse and the drive pulse is always present during the same period of time. The same data is supplied to the columns of the display during the complete duration of each frame period of the drive voltage waveform during the shaking pulse. Thus, when the lines of pixels (usually the rows) are selected one by one during these frames, the data voltages at the data electrodes (usually the column electrodes) do not change. The capacitances associated with the columns need not be charged and the power efficiency will increase significantly. In many cases, each column will be supplied with identical data during one frame;

however this is not a necessary condition for the power efficiency to increase. Specifically, when shaking pulses are being applied, it will also be possible for example for adjacent columns to operate at opposite polarities for the entire frame period. This may further reduce the visibility of the shaking pulses by virtue of the column inversion technique, whilst the power will not increase as still each column does not change its voltage for the entire frame period.

Alternatively, as during these frame periods the same shaking levels have to be supplied to all the pixels, it is possible to select all the lines of pixels simultaneously. However, now a large charge current is required to charge all the pixels at the same time. If the pixels are selected during the complete frame time, it would be possible to limit the charge current. If all the pixels are selected at the same time, the duration of the level(s) of the shaking pulse may be shorter than the frame period, thus shortening the image update period. For example, a single line select period may suffice, however this would give rise to the high capacitive currents into the pixels capacitances, and the power consumption due to electrode capacitances will not comparatively decrease. The peak power consumption will increase.

In an embodiment in accordance with the invention as claimed in claim 2, the duration of the reset pulse depends for each pixel on the optical transition to be made.

A too long reset pulse has the drawback that the particles will be pressed together too much in one of the extreme positions, which makes it difficult to move them away from this extreme position. Thus, it is an advantage when the reset pulse varies with the optical state transitions of the pixels. For example, if black and white particles are used, two intermediate optical states may be defined: dark grey and light grey. The optical state transitions are: black to dark grey, black to light grey, black to white, white to light grey, white to dark grey, white to black, dark grey to black, dark grey to light grey, dark grey to white, light grey to black, light grey to dark grey, light grey to white.

By way of example, if the shaking pulse were to immediately precede the reset pulse, and the drive pulses start all at the same instant, the time of occurrence of the shaking pulse will depend on the duration of the reset pulse and thus will be different for pixels which have different transitions of their optical states. Thus, during a particular frame period some pixels must receive a shaking pulse while other pixels should not receive a shaking pulse. To be able to only supply the shaking pulse to the pixels which should receive it, each level of the shaking pulse has to be available during a complete frame period during which all the rows of pixels have to be selected one by one. In the present invention, the shaking pulse occurs during the same period in time for all pixels. Now, still the rows of pixels are selected one by one during each frame period. But, because the data at the column electrodes is stable during the complete frame period, the power consumption will be considerably less. Alternatively, it is possible to select, during the shaking pulse, all the pixels in a single line period and to supply the same drive voltage to all the pixels, although the duration of the reset pulse is different for pixels which have different optical transitions.

If the reset pulse has a duration less than its maximum duration, due to the shaking pulse which always occurs during the same shaking period, a not yet used time period exists between the shaking pulse and the reset pulse, or between the reset pulse and the drive pulse, or both. If this not yet used time period (the dwell time) becomes too large a disturbance of the desired optical state of the pixel may occur.

In an embodiment in accordance with the invention as claimed in claim 3, both first and second shaking pulses are generated. The first shaking pulse is present during the same first shaking period which precedes the reset period in which the reset pulse is applied. The second shaking pulse is present during the same second shaking period which precedes the drive period during which the drive pulse is applied. This second shaking pulse further improves the reproduction quality of the picture to be displayed.

In an embodiment in accordance with the invention as claimed in claim 4, an over-reset is used wherein the duration of the reset pulse is somewhat longer than required to better move the particles to the extreme positions. It is possible to select from a limited number of possible durations of the reset pulse. However, preferably, a sufficient number of durations of the reset pulses is available to obtain a comparable over-reset effect for different optical transitions.

In an embodiment in accordance with the invention as claimed in claim 5, the duration of the reset pulses is proportional to the distance required for the particles to move. As now no over-reset but a proportional reset is applied, the particles can easily be moved after the reset pulse as they are not packed together more than required.

In an embodiment in accordance with the invention as claimed in claims 6 and 7, an extra shaking pulse is introduced in the not yet used time period which exists between the shaking pulse and the reset pulse, or between the reset pulse and the drive pulse, respectively. The extra shaking pulse may comprise a single pulse or a plurality of pulses.

In an embodiment in accordance with the invention as claimed in claim 8, the pulses of the extra shaking pulse have an energy content which is lower than the energy content of the first and second shaking pulses because the effect of dwell-time is small and the optical disturbance caused by the extra shaking pulses should be small.

These and other aspects of the invention are apparent from and will be elucidated with reference to the embodiments described hereinafter.

Figure 2:
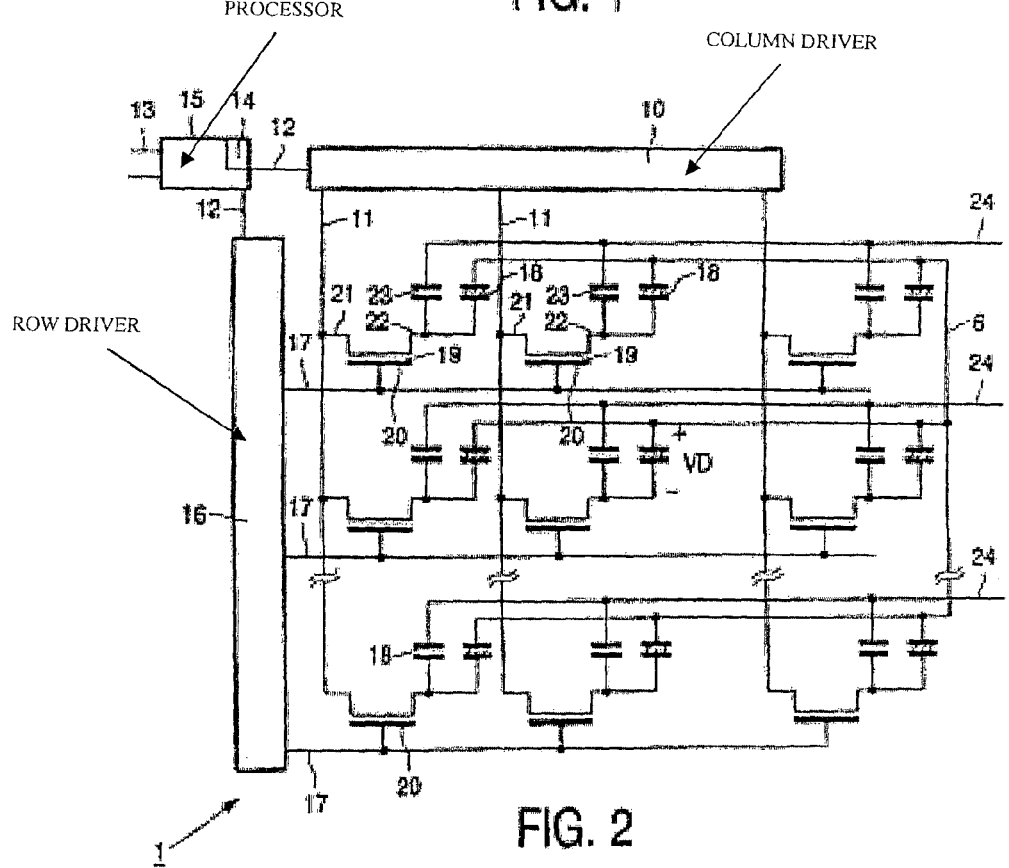
Figures 6A, 6B, 6C, 6D:
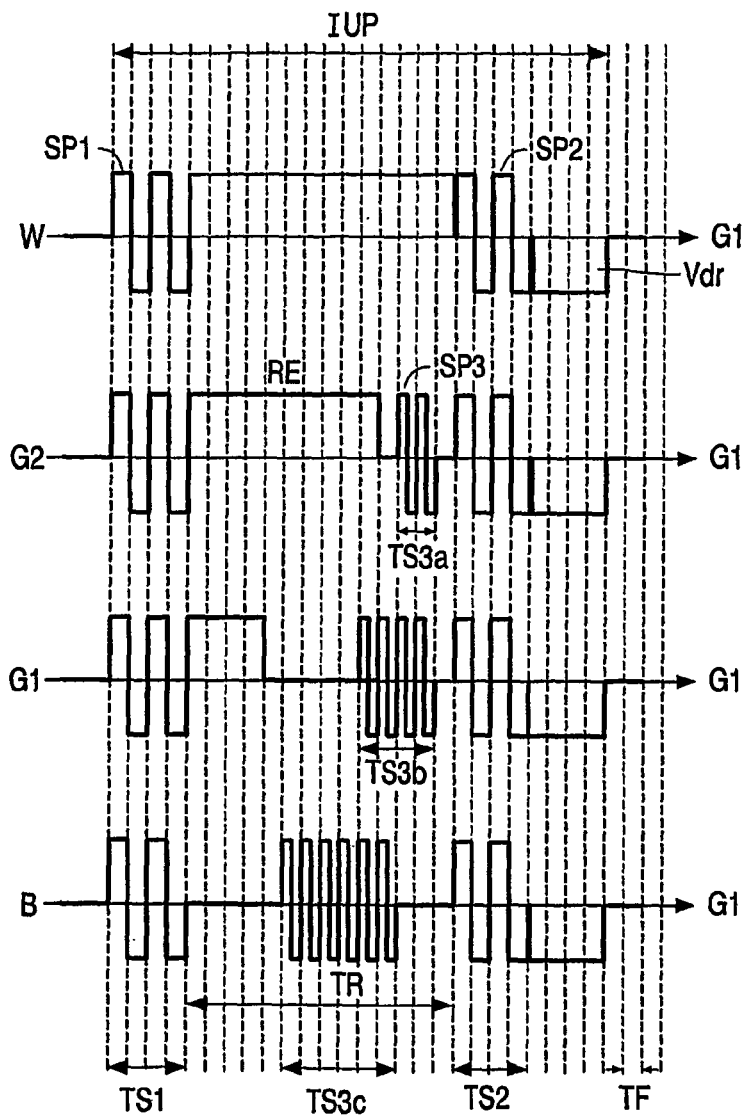
Figure 7:
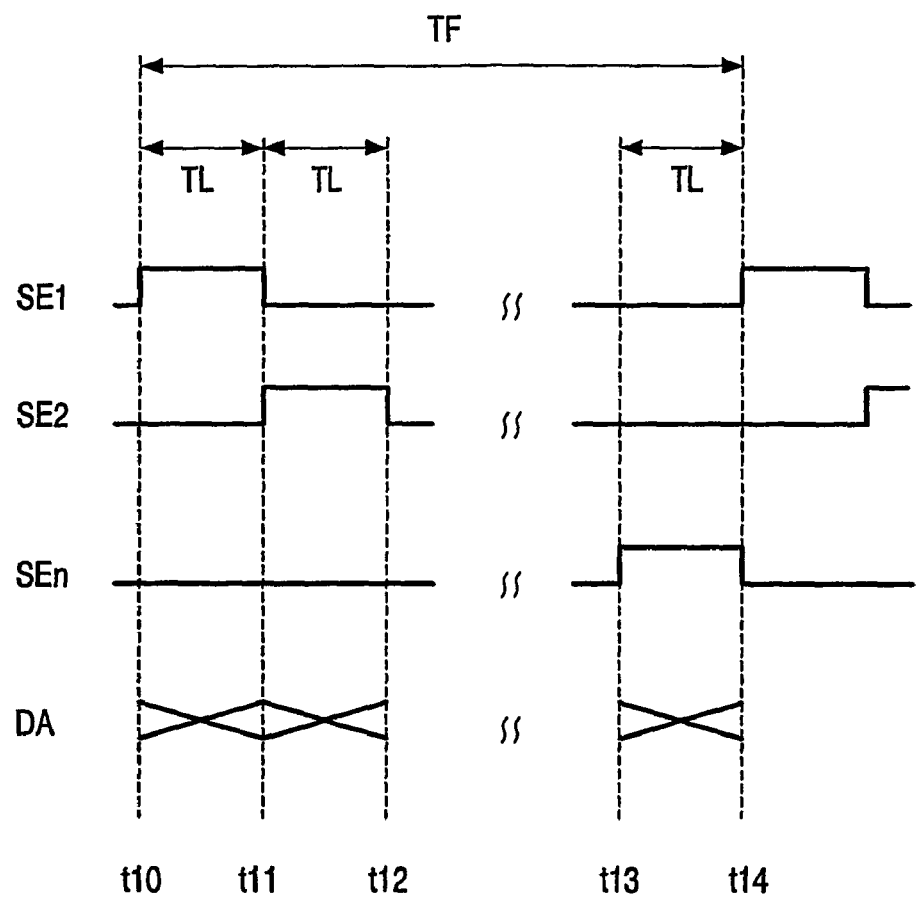

In the drawings:

FIG. 1 shows diagrammatically a cross-section of a portion of an electrophoretic display, FIG. 2 shows diagrammatically a picture display apparatus with an equivalent circuit diagram of a portion of the electrophoretic display, FIG. 3 shows voltages across a pixel in different situations wherein over-reset and various sets of shaking pulses are used, FIG. 4 shows voltages across a pixel if the shaking periods occur during the same time periods and no over-reset is used, FIG. 5 shows voltages across a pixel wherein a further shaking pulse is present preceding the reset pulse if the reset pulse does not occur during the complete reset period, FIG. 6 shows voltages across a pixel wherein further shaking pulses are present trailing the reset pulses if the reset pulses do not occur during the complete reset periods, and FIG. 7 shows signals occurring during a frame period.

FIG. 1 shows diagrammatically a cross-section of a portion of an electrophoretic display, for example of the size of a few display elements, comprising a base substrate 2, an electrophoretic film with an electronic ink which is present between two transparent substrates 3 and 4 which, for example, are of polyethylene. One of the substrates 3 is provided with transparent pixel electrodes 5, 5' and the other substrate 4 with a transparent counter electrode 6. The electronic ink comprises multiple microcapsules 7 of about 10 to 50 microns. Each microcapsule 7 comprises positively charged white particles 8 and negatively charged black particles 9 suspended in a fluid 40. The dashed material 41 is a polymer binder. The layer 3 is not necessary, or could be a glue layer. When the pixel voltage VD across the pixel 18 (see FIG. 2) is supplied as a positive drive voltage Vdr (see, for example, FIG. 3 to the pixel electrodes 5, 5' with respect to the counter electrode 6, an electric field is generated which moves the white particles 8 to the side of the microcapsule 7 directed to the counter electrode 6 and the display element will appear white to a viewer. Simultaneously, the black particles 9 move to the opposite side of the microcapsule 7 where they are hidden from the viewer. By applying a negative drive voltage Vdr between the pixel electrodes 5, 5' and the counter electrode 6, the black particles 9 move to the side of the microcapsule 7 directed to the counter electrode 6, and the display element will appear dark to a viewer (not shown). When the electric field is removed, the particles 8, 9 remain in the acquired state and the display exhibits a bi-stable character and consumes substantially no power. Electrophoretic media are known per se from e.g. U.S. Pat. Nos. 5,961,804, 6,120,839 and 6,130,774 and may be obtained from E-ink Corporation.

FIG. 2 shows diagrammatically a picture display apparatus with an equivalent circuit diagram of a portion of the electrophoretic display. The picture display device 1 comprises an electrophoretic film laminated on the base substrate 2 provided with active switching elements 19, a row driver 16 and a column driver 10. Preferably, the counter electrode 6 is provided on the film comprising the encapsulated electrophoretic ink, but, the counter electrode 6 could be alternatively provided on a base substrate if a display operates based on using in-plane electric fields. Usually, the active switching elements 19 are thin-film transistors TFT. The display device 1 comprises a matrix of display elements associated with intersections of row or selection electrodes 17 and column or data electrodes 11. The row driver 16 consecutively selects the row electrodes 17, while the column driver 10 provides data signals in parallel to the column electrodes 11 for the selected row electrode 17. Preferably, a processor 15 firstly processes incoming data 13 into the data signals to be supplied by the column electrodes 11.

The drive lines 12 carry signals which control the mutual synchronisation between the column driver 10 and the row driver 16.

The row driver 16 supplies an appropriate select pulse to the gates of the TFT's 19 which are connected to the particular row electrode 17 to obtain a low impedance main current path of the associated TFT's 19. The gates of the TFT's 19 which are connected to the other row electrodes 17 receive voltage such that their main current paths have a high impedance. The low impedance between the source electrodes 21 and the drain electrodes of the TFT's allows the data voltages present at the column electrodes 11 to be supplied to the drain electrodes which are connected to the pixel electrodes 22 of the pixels 18. In this manner, a data signal present at the column electrode 11 is transferred to the pixel electrode 22 of the pixel or display element 18 coupled to the drain electrode of the TFT if the TFT is selected by an appropriate level on its gate. In the embodiment shown, the display device of FIG. 1 also comprises an additional capacitor 23 at the location of each display element 18. This additional capacitor 23 is connected between the pixel electrode 22 and one or more storage capacitor lines 24. Instead of TFTs, other switching elements can be used, such as diodes, MIMs, etc.

FIG. 3 shows voltages across a pixel in different situations wherein over-reset is used. By way of example, FIG. 3 are based on an electrophoretic display with black and white particles and four optical states: black B, dark grey G1, light grey G2, white W. FIG. 3A shows an image update period IUP for a transition from light grey G2 or white W to dark grey G1. FIG. 3B shows an image update period IUP for a transition from dark grey G1 or black B to dark grey G1. The vertical dotted lines represent the frame periods (which usually last 20 milliseconds), the line periods occurring within the frame periods are not shown.

In both FIG. 3A and FIG. 3B, the pixel voltage VD across a pixel 18 comprises successively first shaking pulses SP1, SP1', a reset pulse RE, RE', second shaking pulses SP2, SP2' and a drive pulse Vdr. The driving pulses Vdr occur during the same drive period TD which lasts from instant t7 to instant t8. The second shaking pulses SP2, SP2' immediately precede the driving pulses Vdr and thus occur during a same second shaking period TS2. The reset pulse RE, RE' immediately precede the second shaking pulses SP2, SP2'. However, due to the different duration TR1, TR1' of the reset pulses RE, RE', respectively, the starting instants t3 and t5 of the reset pulses RE, RE' are different. The first shaking pulses SP1, SP1' which immediately precede the reset pulses RE, RE', respectively, thus occur during different first shaking periods in time TS1, TS1', respectively.

In the embodiment in accordance with the invention, the second shaking pulses SP2, SP2' occur for every pixel 18 during a same second shaking period TS2. This will cause a lower power consumption if the usual row at a time select addressing is applied. But, alternatively this enables to select the duration of this second shaking period TS2 much shorter as shown in FIGS. 3A and 3B. For clarity, each one of levels of the second shaking pulses SP2, SP2' is present during a frame period TF. In fact, in accordance with the invention, now, during the second shaking period TS2, the same voltage levels can be supplied to all the pixels 18. Thus, instead of selecting the pixels 18 line by line, it is now possible to select all the pixels 18 at once, and only a single line select period TL (see FIG. 7) suffices per level. Thus, in the embodiment in accordance with the invention shown in FIGS. 3A and 3B, the second shaking period TS2 only needs to last four line periods TL instead of four standard frame periods TF.

Alternatively, it is also possible to change the timing of the drive signals such that the first shaking pulses SP1 and SP1' are aligned in time, the second shaking pulses SP2 are then no longer aligned in time (not shown). Now, either the power consumption decreases because of the aligned first shaking pulses SP1 and SP1', or the first shaking period TS1 can be much shorter. The power efficiency increases maximally if both the first shaking pulses SP1 and SP1' and the second shaking pulses SP2 are aligned in time.

The driving pulses Vdr are shown to have a constant duration, however, the drive pulses Vdr may have a variable duration.

If the drive method shown in FIGS. 3A and 3B is applied to the electrophoretic display, outside the second shaking period TS2, the pixels 18 have to be selected line by line by activating the switches 19 line by line. The voltages VD across the pixels 18 of the selected line are supplied via the column electrodes 11 in accordance with the optical state the pixel 18 should have. For example, for a pixel 18 in a selected row of which pixel the optical state has to change from white W to dark grey G1, a positive voltage has to be supplied at the associated column electrode 11 during the frame period TF starting at instant t0. For a pixel 18 in the selected row of which pixel the optical state has to change from black B to dark grey G1, a zero voltage has to be supplied at the associated column electrode during the frame period TF lasting from instants t0 to t1.

FIG. 3C shows a waveform which is based on the waveform shown in FIG. 3B. This waveform of FIG. 3C causes the same optical transition. The difference is that the first shaking pulses SP1' of FIG. 3B are now shifted in time to coincide with the shaking pulses SP1 of FIG. 3A. The shifted shaking pulses SP1' are indicated by SP1". Thus, now, independent on the duration of the reset pulse RE, also all the shaking pulses SP1, SP1" occur during the same shaking period TS1. This has the advantage that independent of the optical transition, the same shaking pulses SP1, SP1" and SP2, SP2' can be supplied to all columns during the associated frame periods. The energy efficiency will increase maximally. Or, alternatively, both during the first shaking period TS1 and the second shaking period TS2 it is not required to select the pixels 18 line by line. Whilst in FIG. 3C the shaking pulses SP1" and SP2' have a predetermined high or low level during a complete frame period, it is possible to use shaking pulses SP1" and SP2' lasting one or more line periods TL (see FIG. 7). In this manner, the image update time may be maximally shortened. Further, due to the selection of all lines at the same time and providing a same voltage to all columns, during the shaking periods TS1 and TS2, the capacitances between neighboring pixels and electrodes will have no effect. This will minimize capacitive currents and thus dissipation. Even flier, the common shaking pulses SP1, SP1" and SP2, SP2' enable implementing shaking by using structured counter electrodes 6.

A disadvantage of this approach is that a small dwell time is introduced (between the first shaking pulse period TS1 and the reset period TR1'). Dependent on the electrophoretic display used, this dwell time should not become longer than, for example, 0.5 seconds.

FIG. 3D shows a waveform which is based on the waveform shown in FIG. 3C. To this waveform third shaking pulses SP3 are added which occur during a third shaking period TS3. The third shaking period TS3 occurs between the first shaking pulses SP1 and the reset pulse RE', if this reset pulse RE' does not have it maximum length. The third shaking pulses SP3 may have a lower energy content than the first shaking pulses SP1 to minimize the visibility of the shaking. It is also possible that the third shaking pulses SP3 are a continuation of the first shaking pulses SP1. Preferably, the third shaking pulses SP3 fill up the complete period in time available between the first shaking period TS1' and the reset period TR1' to minimize the image retention and to increase the grey scale accuracy. With respect to the embodiment in accordance with the invention shown in FIG. 3C, the image retention is further reduced and the dwell time is massively reduced.

Alternatively, it is possible that the reset pulse RE' occurs immediately after the first shaking pulses SP1 and the third shaking pulses occur between the reset pulse RE' and the second shaking pulses SP2'.

In many cases, during the period of shaking pulses, each column will be supplied with identical data during one frame, however this is not a necessary condition for the power efficiency to increase. Specifically, when shaking pulses are being applied, it will also be possible for example for adjacent columns to operate at opposite polarities for the entire frame period. This may further reduce the visibility of the shaking pulses by virtue of the column inversion technique, whilst the power will not increase as still each column does not change its voltage for the entire frame period.

The embodiments in accordance with the invention shown in FIG. 3 are based on an over-reset. The image retention can be further improved by using reset pulses RE, RE' which have a length which is proportional to the distance the particles 8, 9 have to move between the pixel electrode 5, 5' and the counter electrode 6. Embodiments in accordance with the invention which are based on such proportional reset pulses are shown in FIGS. 4 to 6.

FIG. 4 shows voltages across a pixel if the shaking periods occur during the same time periods and no over-reset is used. FIG. 4 shows drive waveforms for all optical transitions to dark grey G1.

Figures 4A, 4B, 4C, 4D:
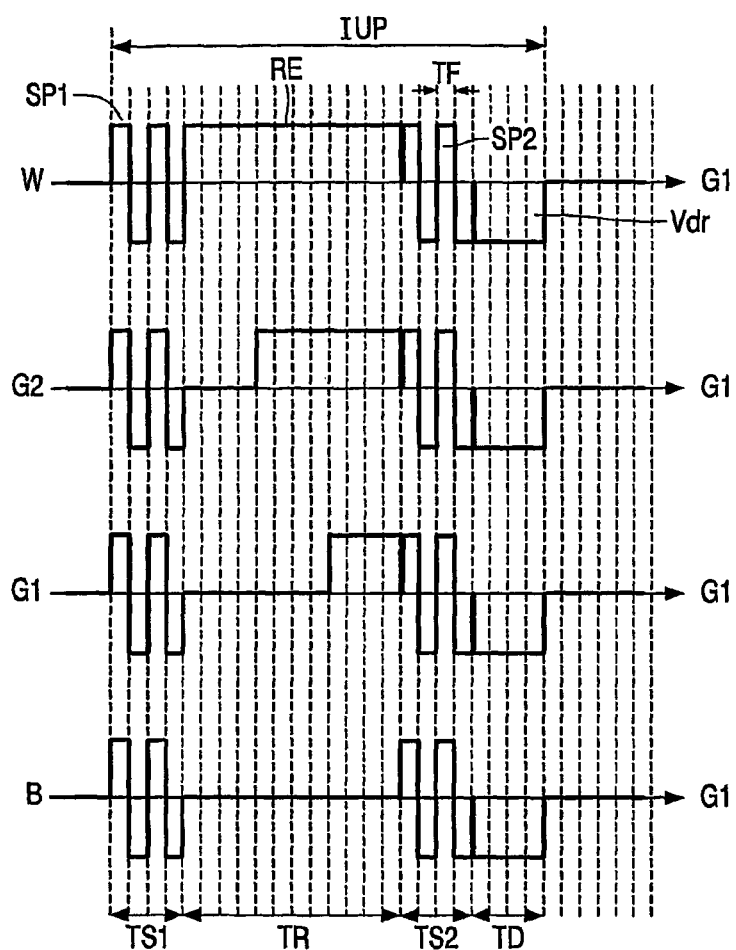

FIG. 4A shows a waveform required to change the optical state of the pixel 18 from white W to dark grey G1. FIG. 4B shows a waveform required to change the optical state of the pixel 18 from light grey G2 to dark grey G1. FIG. 4C shows a waveform required to keep the optical state of the pixel 18 dark grey G1. FIG. 4D shows a waveform required to change the optical state of the pixel 18 from black B to dark grey G1. For other transitions similar drive waveforms are required. For example, for the transition from white W to black B, portions of the waveform of FIG. 4A can be used, but with Vdr=0V.

In all FIG. 4, the first shaking pulses SP1 occur during the same first shaking period TS1, the second shaking pulses SP2 occur during the same second shaking period TS2, and the driving pulse Vdr occurs during the same drive period TD. The driving pulses Vdr may have different durations. The reset pulse RE has a length which depends on the optical transition of the pixel 18. For example, in a pulse width modulated driving, the full reset pulse width TR is required for resetting the pixels 18 from white W to black B or W to dark grey G1, see FIG. 4A. For resetting the pixels 18 from light grey G2 to black B or G2 to dark grey G1, only ⅔ of the duration of this full reset pulse width TR is required, see FIG. 4B. For resetting the pixels 18 from dark grey G1 to black B or G1 to dark grey, only ⅓ of the duration of this full reset pulse width TR is required, see FIG. 4C. For resetting the pixels 18 from black B to dark grey G1, no reset pulse is required, see FIG. 4D.

These waveforms are also useful when the known transition matrix based driving methods are used in which previous images are considered in determining the impulses (time× voltage) for a next image. Alternatively, these waveforms are also useful when the electrophoretic material used in the display is less sensitive to the image history and/or dwell time.

Thus, independent on the duration of the reset pulse RE, the first shaking pulses SP1 and the second shaking pulses SP2 can be supplied to all the pixels 18 simultaneously, which has the advantages mentioned before.

Figures 5A, 5B, 5C, 5D:
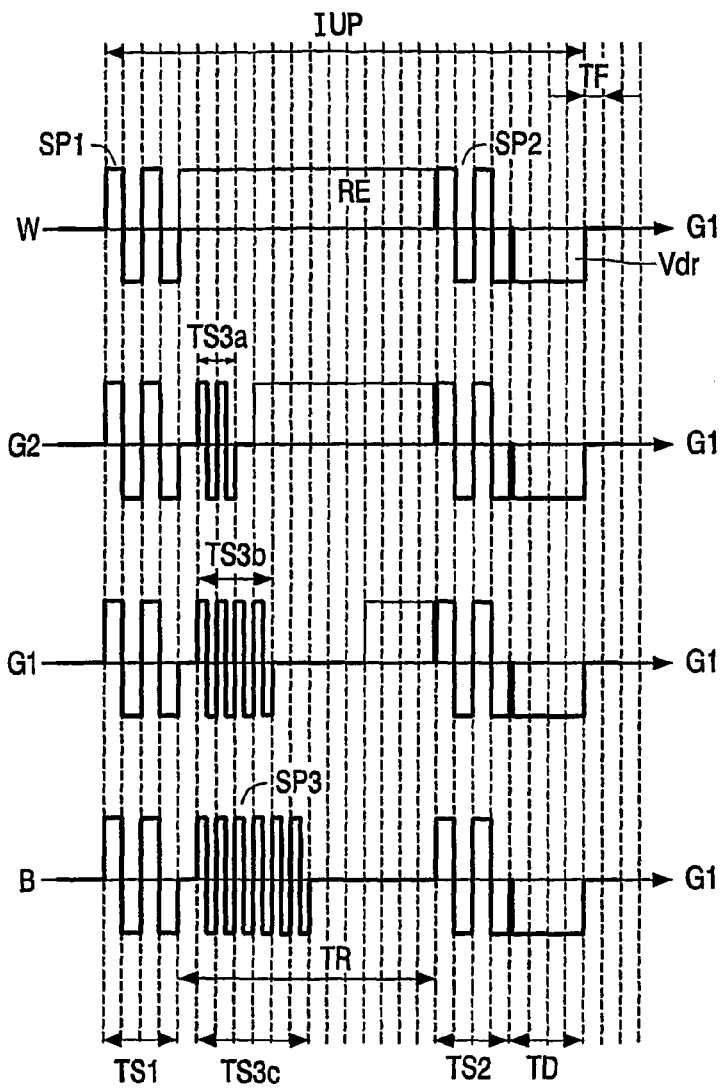

FIG. 5 shows voltages across a pixel wherein further shaking pulses are present preceding the reset pulse if the reset pulse does not occur during the complete reset period. FIG. 5A is identical to FIG. 4A, and FIGS. 5B to 5D are based on FIGS. 4B to 4D, respectively. In FIGS. 5B to 5D, third reset pulses SP3 are added during the period of time TS3a, TS3b, TS3c, respectively, which occurs in-between the first shaking pulses SP1 and the reset pulse RE. These additional third reset pulses SP3 may differ from the first and second shaking pulses SP1 and SP2 in terms of pulse length and/or pulse height depending on the required image quality. Generally, the energy in these additional shaking pulses SP3 may be lower than the energy in the first shaking pulses SP1 because the dwell time effect is small and the optical disturbance should be minimized. The amount of shaking in the different sequences is preferably proportional to the time space available between the first shaking pulses SP1 and the reset pulse RE. More preferably, the time period between the first shaking pulses SP1 and the reset pulse RE is fully filled with the additional shaking pulses SP3 to minimize the image retention and to increase the grey scale accuracy. Again, the advantage of the embodiments in accordance with the invention as elucidated with respect to FIG. 4 is maintained, whilst the degree of image retention and the dwell time effect can be further reduced by the additional shaking.

FIG. 6 shows voltages across a pixel wherein further shaking pulses are present trailing the reset pulse if the reset pulse does not occur during the complete reset period. FIG. 6A is identical to FIG. 5A. In FIGS. 6B to 6D, which are based on FIGS. 5B to 5D, respectively, the position of the reset pulse RE and the additional third shaking pulses SP3 is interchanged such that the reset pulse RE now precedes the additional shaking pulses SP3. Preferably, the reset pulse RE starts immediately after completion of the first shaking pulses SP1. The additional shaking pulses SP3 may cover part of the period in time or the complete period in time between the first and second shaking pulses SP1, SP2 which is not covered by the reset pulse RE. The use of the additional shaking pulses SP3 improves the grey scale accuracy.

FIG. 7 shows signals occurring during a frame period. Usually, each frame period TF indicated in FIGS. 3 to 6 comprises a number of line periods TL which is equal to a number of rows of the electrophoretic display, if this display is a matrix display. In FIG. 7, one of the successive frame periods TF is shown in more detail. This frame period TF starts at the instant t10 and lasts until instant t14. The frame period TF comprises n line periods TL. The first line period TL lasts from instant t10 to t11, the second line period TL lasts from instant t11 to t12, and the last line period TL lasts from instant t13 to t14.

Usually, during the frame period TF, the rows are selected one by one by supplying appropriate select pulses SE1 to SEn to the rows. A row may be selected by supplying a pulse with a predetermined non-zero level, the other rows receive a zero voltage and thus are not selected. The data DA is supplied in parallel to all the pixels 18 of the selected row. The level of the data signal DA for a particular pixel 18 depends on the optical state transition of this particular pixel 18.

Thus, if different data signals DA may have to be supplied to different pixels of a selected row, the frame periods TF shown in FIGS. 3 to 6 comprise the n line or select periods TL. However, if the first and second shaking pulses SP1 and SP2 occur during the same shaking periods TS1 and TS2, respectively, for all the pixels 18 simultaneously, it is possible to select all the lines of pixels 18 simultaneously and it is not required to select the pixels 18 line by line. Thus, during the frame periods TF shown in FIGS. 3 and 6 wherein common shaking pulses are used, it is possible to select all the pixels 18 in a single line period TL by providing the appropriate select pulse to all the rows of the display. Consequently, these frame periods may have a significantly shorter duration (one line period TL, or a number of line periods less than n, instead of n) than the frame periods wherein the pixels 18 may receive different data signals.

By way of example, the addressing of the display is elucidated in more detail with respect to FIG. 3C. At the instant t0 a first frame period TF of an image update period IUP starts. The image update period ends at the instant t8.

The first shaking pulses SP1" are supplied to all the pixels 18 during the first shaking period TS1 which lasts from instant t0 to instant t3. During this first shaking period TS1, during each frame period TF, all the lines of pixels 18 are selected simultaneously during at least one line period TL and the same data signals are supplied to all columns of the display. The level of the data signal is shown in FIG. 3C. For example, during the first frame period TF lasting from instant t0 to t1, a high level is supplied to all the pixels. During the next frame period TF starting at instant t1, a low level is supplied to all the pixels. A same reasoning is valid for the common second shaking period TS2.

The duration of the reset pulse RE, RE' may be different for different pixels 18 because the optical transition of different pixels 18 depends on the image displayed during a previous image update period IUP and the image which should be displayed at the end of the present image update period IUP. For example, a pixel 18 of which the optical state has to change from white W to dark grey G1, a high level data signal DA has to be supplied during the frame period TF which starts at instant t3, while for a pixel 18 of which the optical state has to change from black B to dark grey G1, a zero level data signal DA is required during this frame period. The first non-zero data signal DA to be supplied to this last mentioned pixel 18 occurs in the frame period TF which starts at the instant t4. In the frames TF wherein different data signals DA may have to be supplied to different pixels 18, the pixels 18 have to be selected row by row.

Thus, although all the frame periods TF in FIGS. 3 to 6 are indicated by equidistant vertical dotted lines, the actual duration of the frame periods may be different. In frame periods TF in which different data signals DA have to be supplied to the pixels 18, usually the pixels 18 have to be selected row by row and thus n line select periods TL are present. In frame periods TF in which the same data signals DA have to be supplied to all the pixels 18, the frame period TF may be as short as a single line select period TL. However, it is possible to select all the lines simultaneously during more than a single line select period TL.

To conclude, the present invention is directed to an electrophoretic display which comprises a plurality of pixels 18 with an electrophoretic material 8, 9 which comprises charged particles. A first electrode 6 and second electrode 5, 5' associated with each one of the pixels 18 presents a drive voltage waveform VD across each one of the pixels 18. The charged particles are able to occupy, between the first electrode 6 and the second electrode 5, two limit positions and intermediate positions between the two limit positions which are defined by the drive voltage VD.

An addressing circuit 16, 10 generates the drive voltage waveform VD by successively applying between the first electrode 6 and the second electrode 5 during an image update period IUP: (i) a reset pulse RE enabling said particles to substantially occupy one of the extreme positions, and (ii) a drive pulse Vdr having a level in accordance with an optical state to be reached by the associated one of the pixels 18. The addressing circuit 16, 10 further generates a first shaking pulse SP1 comprising at least one preset pulse having an energy sufficient to release particles present in one of the extreme positions, but insufficient to enable said particles to reach the other one of the extreme positions. The first shaking pulse SP1 occurs during a same first shaking time period TS1 during each image update periods IUP, independent on the optical state a pixel 18 should reach. The first shaking time period TS1 precedes the reset pulse RE or occurs in-between the reset pulse RE and the drive pulse Vdr.

Thus, although the drive voltage waveform VD has to comprise different portions such that different pixels 18 may reach different optical states, the shaking pulse or pulses SP1, SP2 always occur(s) at the same position within the drive voltage waveform VD. Consequently, the level(s) of the shaking pulse(s) SP1, SP2 can be supplied to all the pixels 18 during the same frame periods TF.

It should be noted that the above-mentioned embodiments illustrate rather than limit the invention, and that those skilled in the art will be able to design many alternative embodiments without departing from the scope of the appended claims. For example, the second shaking pulses SP2 need not be present. A higher energy efficiency or a shorter image update period IUP is already reached if only one set of shaking pulses SP1 or SP2 is present and this set occurs during a same shaking period TS1 or TS2. Although in the Figures is referred to shaking pulses which comprise during each of the shaking periods several preset pulses or levels, it is possible that the shaking pulse comprises a single level or preset pulse only.

In the claims, any reference signs placed between parenthesis shall not be construed as limiting the claim. The word "comprising" does not exclude the presence of other elements or steps than those listed in a claim. The invention can be implemented by means of hardware comprising several distinct elements, and by means of a suitably programmed computer. In the device claim enumerating several means, several of these means can be embodied by one and the same item of hardware.

The invention claimed is:

1. An electrophoretic display comprising:
a plurality of pixels having an electrophoretic material comprising charged particles being at least able to occupy, between a first electrode and a second electrode of the pixels, one of two limit positions, and
an addressing circuit for generating a drive voltage waveform to the pixels for determining an optical state of the pixels by applying, between the first electrode and the second electrode, during each image update period:
(i) a reset pulse for driving said particles to substantially occupy one of the limit positions, and
(ii) a drive pulse having an energy in accordance with an optical state to be reached by the associated one of the pixels,
wherein the addressing circuit is arranged for further applying a first shaking pulse during a first shaking time period of each image update period that occurs at a first time and for a first duration for each image update period, the occurrence of the first shaking time period being independent of the optical state to be reached by the associated one of the pixels, the first shaking period preceding the drive pulse, the first shaking pulse comprising at least one preset pulse, with each preset pulse having an energy sufficient to release particles present in one of the limit positions but insufficient to enable said particles to reach the other one of the limit positions, wherein each of the reset pulse, the drive pulse and the first shaking pulse occur during different ones of the number of time periods and if the reset pulse has a duration shorter than a maximum duration, the addressing circuit is arranged for generating a third shaking pulse during at least part of a third shaking period occurring in-between the first shaking pulse and the reset pulse.

2. The electrophoretic display as claimed in claim 1, wherein the addressing circuit is arranged for generating the reset pulse having a duration depending on a difference between optical states of the associated one of the pixels before and after the image update period.

3. The electrophoretic display as claimed in claim 1, wherein the addressing circuit is arranged for applying the first shaking pulse preceding the reset pulse and for further generating a second shaking pulse in-between the reset pulse and the drive pulse, wherein the second shaking pulse occurs during a second shaking time period of each image update period that occurs at a second time and occurs for a second duration for each image update period, wherein the first time is a different time of each image update period than the second time.

4. The electrophoretic display as claimed in claim 1, wherein the addressing circuit is arranged for generating the reset pulse with a duration extended to be longer than required to have the particles occupying one of the limit positions.

5. The electrophoretic display as claimed in claim 1, wherein the addressing circuit is arranged for generating the reset pulse with a duration substantially proportional with a distance required for the particles to move from a present position to one of the limit positions.

6. The electrophoretic display as claimed in claim 1, wherein the electrophoretic display is a matrix display comprising: select electrodes for selecting lines of pixels associated with the select electrodes, and data electrodes for supplying data signals to a selected one of the lines of pixels, and wherein the addressing circuit is arranged for applying to every data electrode the first shaking pulse at the first time and for the first duration of each image update period, different polarities of the first shaking pulses being supplied to at least two different data electrodes.

7. An electrophoretic display comprising:
a plurality of pixels having an electrophoretic material comprising charged particles being at least able to occupy, between a first electrode and a second electrode of the pixels, one of two limit positions, and
an addressing circuit for generating a drive voltage waveform to the pixels for determining an optical state of the pixels by applying between the first electrode and the second electrode during each image update period:
(i) a reset pulse for enabling said particles to substantially occupy one of the limit positions, and
(ii) a drive pulse having an energy in accordance with an optical state to be reached by the associated one of the pixels,
wherein the addressing circuit is arranged for further applying a first shaking pulse during a same first shaking time period of each image update period, the occurrence of the first shaking time period being independent of the optical state to be reached by the associated one of the pixels, the first shaking period preceding the drive pulse, the first shaking pulse comprising at least one preset pulse having an energy sufficient to release particles present in one of the limit positions but insufficient to enable said particles to reach the other one of the limit positions, wherein, if the reset pulse has a duration shorter than a maximum duration, the addressing circuit is arranged for generating a third shaking pulse during at least part of a third shaking period occurring in-between the first shaking pulse and the reset pulse.

8. The electrophoretic display as claimed in claim 7, wherein the addressing circuit is arranged for generating the third shaking pulse having a lower energy content than the first shaking pulse.

9. An electrophoretic display comprising:
a plurality of pixels having an electrophoretic material comprising charged particles being at least able to occupy, between a first electrode and a second electrode of the pixels, one of two limit positions, and
an addressing circuit for generating a drive voltage waveform to the pixels for determining an optical state of the pixels by applying between the first electrode and the second electrode during each image update period:
(i) a reset pulse for enabling said particles to substantially occupy one of the limit positions, and
(ii) a drive pulse having an energy in accordance with an optical state to be reached by the associated one of the pixels,
wherein the addressing circuit is arranged for further applying a first shaking pulse during a same first shaking time period of each image update period, the occurrence of the first shaking time period being independent of the optical state to be reached by the associated one of the pixels, the first shaking period preceding the drive pulse, the first shaking pulse comprising at least one preset pulse having an energy sufficient to release particles present in one of the limit positions but insufficient to enable said particles to reach the other one of the limit positions, wherein, if the reset pulse has a duration shorter than a maximum duration, the addressing circuit is arranged for generating a third shaking pulse during at least part of a third shaking period occurring in-between the reset pulse and the drive pulse.

10. The electrophoretic display as claimed in claim 9, wherein the addressing circuit is arranged for further generating a second shaking pulse in-between the third shaking pulse and the drive pulse, wherein the second shaking pulse occurs during a same second shaking time period.

11. The electrophoretic display as claimed in claim 9, wherein the addressing circuit is arranged for generating the third shaking pulse having a lower energy content than the first shaking pulse.

12. A display apparatus comprising an electrophoretic display as claimed in any one of the claims 1 to 10.

13. A method of driving an electrophoretic display comprising a plurality of pixels having an electrophoretic material comprising charged particles being at least able to occupy, between a first electrode and a second electrode of the pixels, one of two limit positions, the method comprising acts of:

supplying a drive voltage waveform to the pixels for determining an optical state of the pixels by applying between the first electrode and the second electrode during each image update period:
(i) a reset pulse for enabling said particles to substantially occupy one of the limit positions, and
(ii) a drive pulse having an energy in accordance with an optical state to be reached by the associated one of the pixels,
wherein the step of supplying further applies a first shaking pulse during a first shaking time period of each image update period that occurs at a first time and for a first duration for each image update period, the occurrence of the first shaking time period being independent of the optical state to be reached by the associated one of the pixels, the first shaking period preceding the drive pulse, the first shaking pulse comprising at least one preset pulse, with each preset pulse having an energy sufficient to release particles present in one of the limit positions but insufficient to enable said particles to reach the other one of the limit positions, wherein each of the reset pulse, the drive pulse and the first shaking pulse occur during different ones of the number of time periods, and if the reset pulse has a duration shorter than a maximum duration, the method comprising an act of generating a third shaking pulse during at least part of a third shaking period occurring in-between the first shaking pulse and the reset pulse.

* * * * *